Oct. 3, 1944. K. C. BUGG 2,359,402
TOOL
Filed Oct. 25, 1941 3 Sheets-Sheet 3
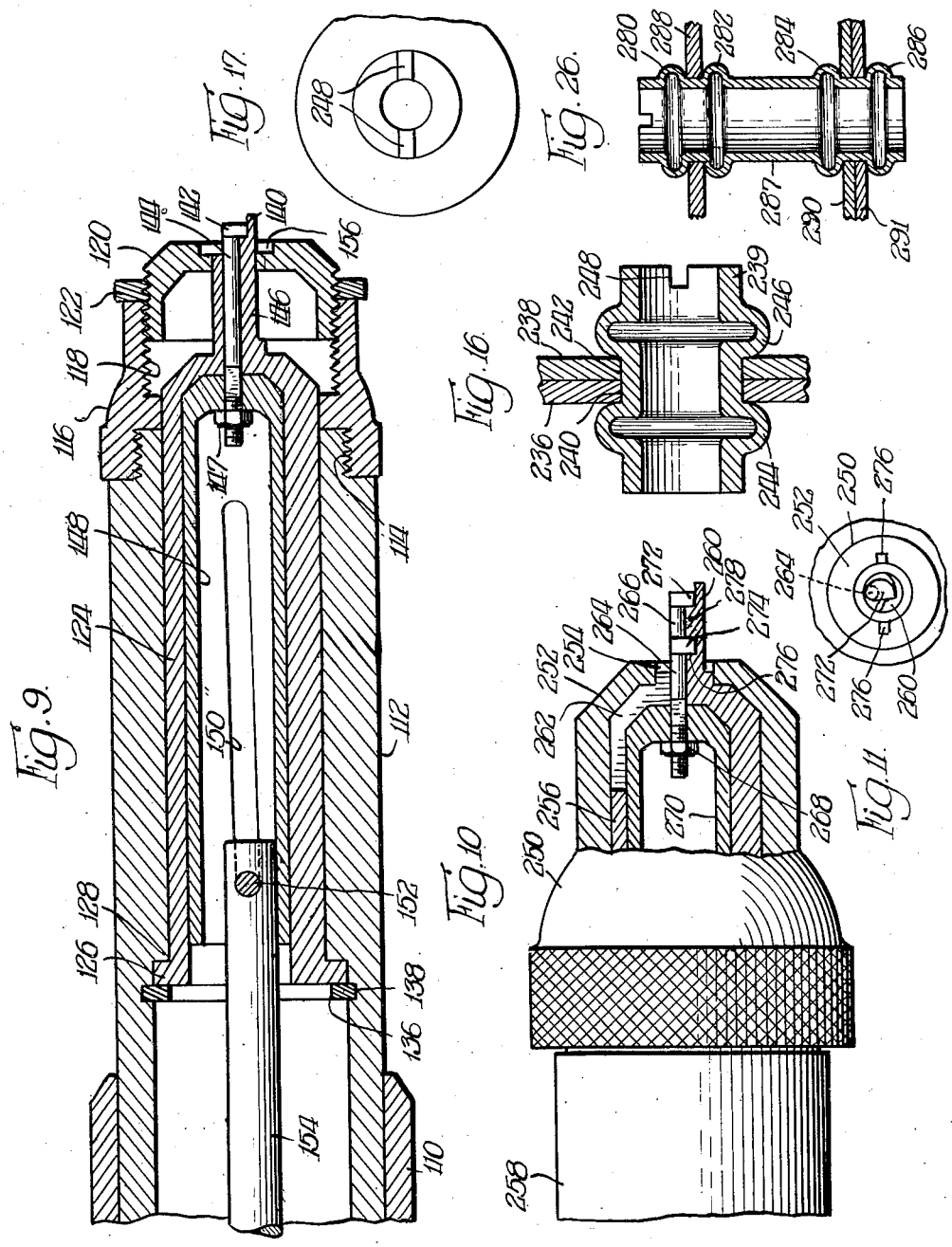
INVENTOR.
Kenly C. Bugg, Patented Oct. 3, 1944

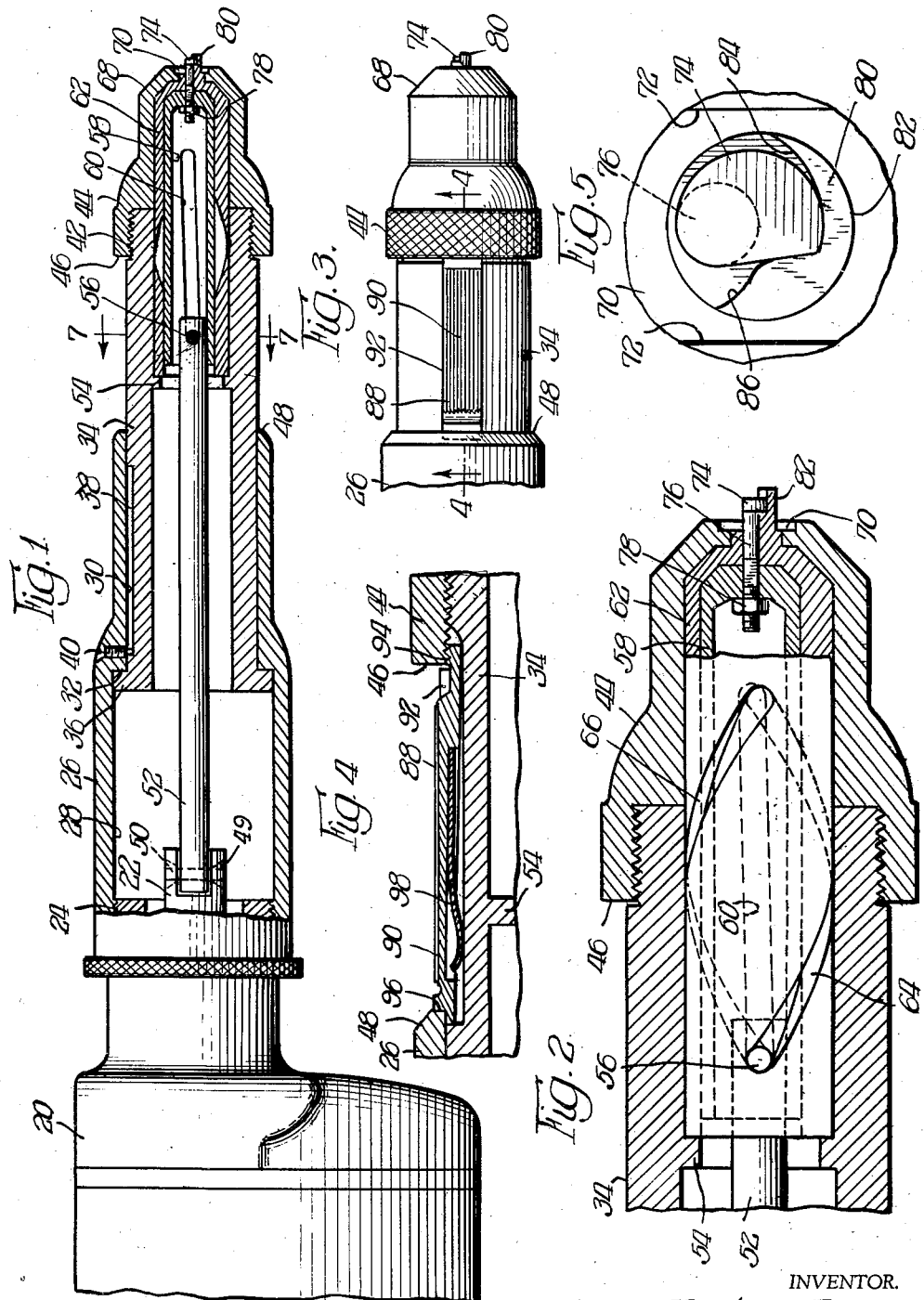

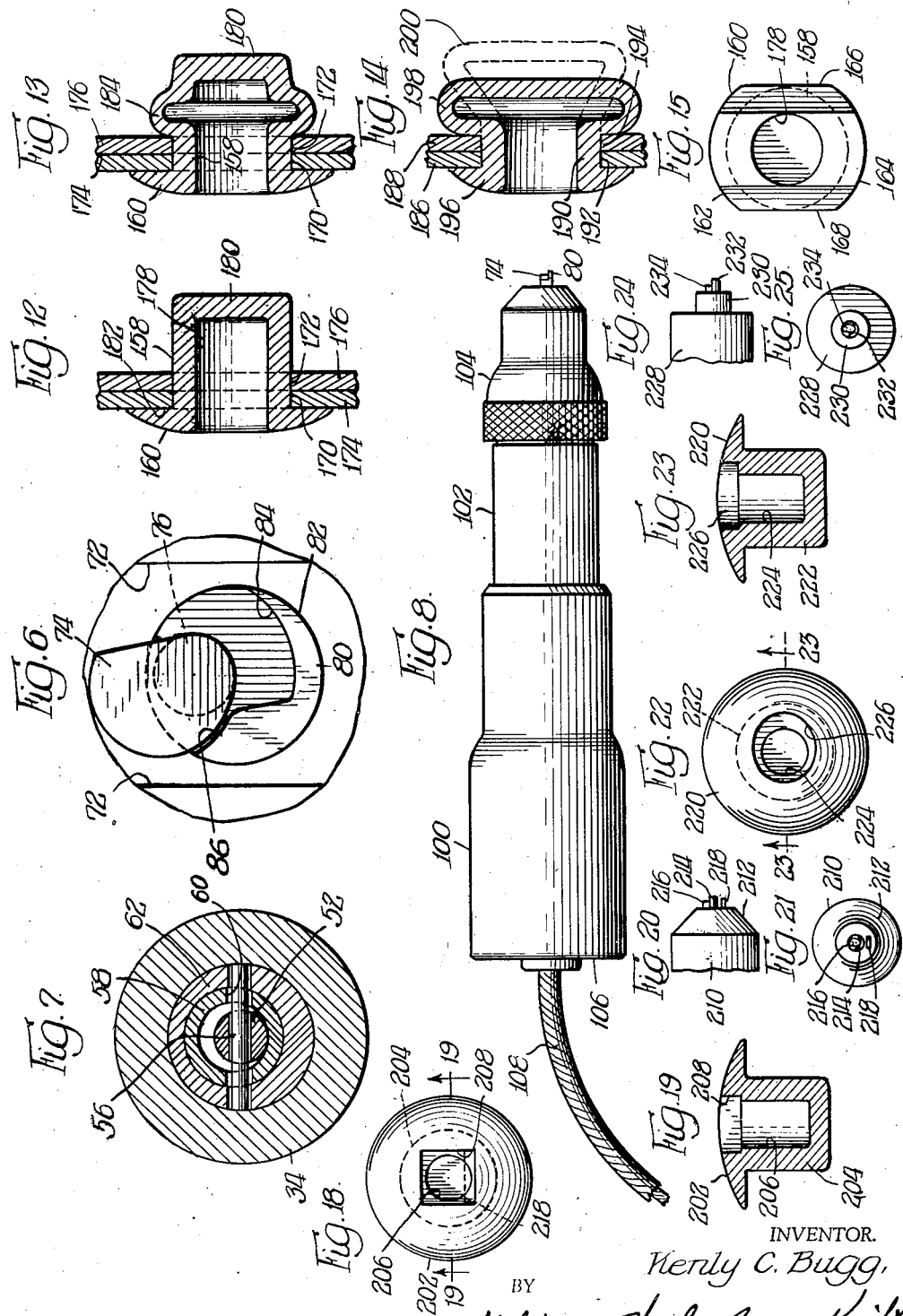

2,359,402

UNITED STATES PATENT OFFICE 2,359,402

TOOL

Kenly C. Bugg, Fort Wayne, Ind.

Application October 25, 1941, Serial No. 416,457

15 Claims. (Cl. 218—19)

This invention pertains to a tool for setting fasteners or rivets, and more particularly to a spinning or upsetting tool for accomplishing this setting, said tool being so constructed and arranged that the entire setting operation is accomplished by one operator and without the use of any backing or holding tool.

An object of this invention is to provide a tool for setting, spinning or upsetting a fastener, said tool being adapted to quickly receive and hold the fastener whereby the fastener may be readily inserted in place for setting, the tool being provided with means for preventing rotation of the fastener when it is being spun or upset. The fastener is preferably provided with a substantially tubular shank which may or may not be closed at the end opposite to that provided with the head, said fastener being adapted to be spun or extruded by the tool into upset condition from the head end and without the use of any backing up means.

Another object is to provide a tool which is adapted to head simultaneously adjacent opposite ends of a tubular rivet and which is provided with means for preventing rotation of the rivet while it is being headed.

Still another object is to provide a tool which is adapted to readily upset an article of manufacture in a predetermined manner to form the equivalent of a head and a point thereon for fastening objects together.

Yet another object is to provide a tool for setting a fastener which performs the function of a rivet, eyelet, bolt, screw or the like for securing members together, but which is adapted to be applied and fastened from only one side of said members to be secured.

A yet further object is to provide a simple tool to perform a fastening operation equivalent to a riveting operation, as by spinning, extruding, or upsetting speedily and in a predetermined manner.

Another further object is to provide a tool to perform a function equivalent to a riveting operation whereby only one operator sets the fastener by a simple tool operation.

Another object is to provide a tool to perform the equivalent of a riveting operation wherein the tool tightly sets the fastening means in holding position and is readily adjusted to properly condition the tool for setting operation regardless of the thickness of the articles to be fastened.

Another object is to provide a fastener adapted to be readily held for setting, and a tool therefor for setting said fastener, the tool and fastener being so constructed and arranged that not only is the tool extremely light in weight and readily portable, but it is adapted to receive and hold the fastener prior to its application whereby the fastener may be readily applied and set in holes not readily accessible.

Another object is to provide a tool for setting fastening means which means may be readily and rapidly removable as by counter-boring, and which may be removed without damage to the material fastened.

Another object is to provide a tool for setting a fastener which fastener is water-tight and/or fills the holes in the material it fastens, and through which it extends, and which is readily removable without injury to the fastened material.

Another object is to provide a tool for setting a rivet adapted to fasten material together, which rivet is so constructed and arranged that when it is in fastened condition, should any expansion due to freezing water, etc., take place, such expansion would serve merely to secure the rivet more tightly rather than to destroy it.

Another object is to provide a tool for setting a rivet of a hollow type, preferably closed at one end, which may be readily filled by material to completely close the opening therein, the rivet being so constructed and arranged that the closing material flowed therein is held by the configuration of the fastener.

Another object is to provide a tool which itself may perform a priming or holding operation of a fastener to be applied, which fastener may be provided with means which may be of infinite configurations for permitting a tool to hold said fastener, both prior to the application of the fastener to the material to be held, and during the setting operation of the fastener.

Another object is to provide a tool for applying fastening means through aligned apertures of materials to be secured, which tool, though rotating, maintains the fastener in non-rotatable condition, said tool automatically expanding on the opposite side of the holes through which it is applied while setting the fastening means, yet which is readily moved to a position where the tool may be retracted without disrupting the fastener.

Another object is to provide a tool for upsetting and/or spinning a fastening point on a fastener in a circle and gradually in order to prevent fragmentation of the said fastener.

Another object is to provide a tool for securing spacing and holding (fastening) means which is operable to set the spacing and holding means in one operation or more if desired, thus providing means for readily securing and/or positioning subassemblies, or stacked and/or spaced assemblies, one in relation to the other. This of course includes multiplicities of any selected number.

Another object is to provide fastening means and a tool for setting the same which are so constructed and arranged that no fracture of the articles secured can occur, yet application of the fastening means serves to draw the articles fastened into tight engagement.

Another object is to provide fastening means and a tool for setting the same whereby the fastener is set by a method other than by a blow or by hammering whereby no jarring of the articles fastened takes place.

Another object is to provide fastening means and a tool for securing the same whereby the fastening means is secured in operative position without the usual noises of hammer blows and the like attendant on the present methods of riveting.

Another object is to provide a fastener such as a hollow rivet and a tool for setting the same, which tool is provided with a nose whereby the fastener may be picked up and positioned by merely pushing the nose of the tool into a quantity of said rivets and priming the tool to hold whichever rivet it enters.

Another object is to provide fastening means and a portable tool for securing or setting the fastening means, which tool may be operated by a single operator without the customary usage of a positioning jig, anvil, backing tool, or the like, such as now used.

Another object is to provide a tool for setting or securing fastening means, which tool is adapted to be fixed whereby the work may be moved toward the fastening means which is held by the tool and a securing operation may be conveniently performed even by a single operator as the tool is so constructed and arranged that nothing interferes with a full sight of the work and fastening means.

With these and various other objects in view, the invention may consist of certain novel features of construction and operation as will be more fully described and particularly pointed out in the specification, drawings and claims appended hereto.

In the drawings, which illustrate embodiments of the device, and wherein like reference characters are used to designate like parts—

Figure 1 is an enlarged fragmentary sectional elevation through one form of setting tool embodying the invention;

Figure 2 is an enlarged fragmentary sectional elevation through the operating end of the tool illustrated in Figure 1, showing the operating cam in collapsed position, that is, in position for application to and reception of a fastener;

Figure 3 is a fragmentary elevation of the tool end of the tool illustrated in Figures 1 and 2 showing latching means for maintaining the tool end in a position illustrated in Figure 1 wherein the operating cam is in a position to receive and be applied to fastening means;

Figure 4 is a fragmentary sectional elevation taken substantially in a plane as indicated by line 4—4 of Figure 3;

Figure 5 is an enlarged plan view of the tool end looking toward the left as viewed in Figures 1, 2 and 3 illustrating the operating cam and a receiving slot for one form of fastening means embodying the invention;

Figure 6 is a plan view corresponding to Figure 5 showing the cam in fully operative position wherein the fastening shoulder has been spun or upset on fastening means such as shown in Figures 12 to 15 inclusive.

Figure 7 is a transverse sectional plan through the tool end illustrated in Figure 1, the same being taken substantially in the plane as indicated by the line 7—7 of Figure 1;

Figure 8 is a modified tool embodying the invention, showing a form of tool adapted to be driven by a remote power supply;

Figure 9 is an enlarged fragmentary sectional elevation, corresponding to the sectional elevation shown in Figure 2, showing a modified form of tool and embodying the invention wherein the tool end is adjustable for different thicknesses of material to be fastened;

Figure 10 is an enlarged fragmentary sectional elevation of another form of tool and embodying the invention wherein a double cam is provided for forming fastening shoulders, particularly on tubular fastening means, all as illustrated in Figures 16 and 17;

Figure 11 is an end elevation of the tool illustrated in Figure 10 showing the holding means for the fastening means illustrated in Figures 16 and 17;

Figure 12 is an enlarged fragmentary sectional elevation showing one form of fastening means embodying the invention, the same being shown inserted in aligned apertures of a pair of members to be secured, and before the tools embodying the invention have been operated to spin or upset the fastening shoulder illustrated in Figure 13;

Figure 13 is an enlarged sectional elevation corresponding to Figure 12 showing the fastening means in fastened position;

Figure 14 is an enlarged fragmentary sectional elevation corresponding to Figure 13 showing another form of shoulder spun or upset on fastening means;

Figure 15 is an enlarged plan view showing one form of head for the fastening means illustrated in Figures 12, 13 and 14, it being understood that other forms of heads may be used, such as tear drop, hex, Phillips, slotted, etc., in fact any shape of head which can be held by the tool end;

Figure 16 is an enlarged sectional elevation corresponding to Figure 13 showing a tubular form of fastening means in set position, said tubular fastening means being adapted to be set by the tool end illustrated in Figure 10;

Figure 17 is an end elevation of the fastening means illustrated in Figure 16, the same being taken at the end which is adapted to be held by the tool, i. e., the right end as viewed in Figure 16;

Figure 18 is a plan view corresponding to Figure 15 showing a circular head for a fastener having means for preventing rotation of the fastener during setting operation;

Figure 19 is a longitudinal sectional elevation of the fastener shown in Figure 18, the same being taken substantially in the plane as indicated by the line 19—19 of Figure 18;

Figure 20 is a fragmentary side elevation of a form of tool end for receiving and setting the fastener shown in Figures 18 and 19;

Figure 21 is a plan view of the tool end shown in Figure 20, the same looking toward the left of Figure 20;

Figure 22 is a plan view corresponding to Figure 18 showing a circular head for a fastener having a modified form of means for preventing rotation of the fastener during setting operation;

Figure 23 is a longitudinal sectional elevation of the fastener shown in Figure 22, the same being taken substantially in the plane as indicated by the line 23—23 of Figure 22;

Figure 24 is a fragmentary side elevation of a form of tool end for receiving and setting the fastener shown in Figures 22 and 23;

Figure 25 is a plan view of the tool end shown in Figure 24, the same looking toward the left of Figure 24;

Figure 26 is a sectional elevation of fastening means applied to secure subassemblies or stackings.

Referring first of all more particularly to the tool illustrated in Figures 1 to 7 inclusive, the tool consists essentially of operating means such as the motor 20, the motor being provided with the drive shaft 22 rotated by the motor, said motor being controlled by well known means such as a trigger switch or the like. The motor housing is threaded as at 24 for the reception of corresponding threads of the main tool barrel or casing 26, said tool barrel 26 being provided with the concentric cylindrical portions 28 and 30, the cylindrical portion 30 being preferably smaller than the cylindrical portion 28 to provide a shoulder or stop 32.

A relatively slidable tool barrel or casing 34 is slidably received in the cylindrical portion 30 and is provided with the stop shoulder 36 limiting the outward movement of the barrel 34 with respect to the barrel 26. Means is provided for preventing the slidable tool barrel 34 from rotating and in the form shown this means takes the form of a slot 38 provided in the barrel 34, which slot is adapted to receive the pin 40 provided in the stationary tool barrel 26. The end of the tool barrel 34 is threaded as at 42 for receiving the complementary threads of the tool end 44 adapted to be applied thereto. The tool end 44, when in applied position, provides a shoulder 46 adapted to abut the end 48 of the barrel 26 for limiting the inward movement of the slidable tool barrel 34.

The motor shaft 22 has a flared slot 49 and is loosely pivotally connected by pin 50 to the shaft 52 which extends through the barrels 26 and 34, passing through an aperture provided in the shoulder or wall 54 provided in the slidable barrel 34, and said shaft somewhat loosely is pinned by pin 56 to the fastener cam or spinner sleeve 58 through the slots 60 provided in said sleeve and disposed at a slight angle to the axis of the outer surface of operating cam sleeve 62. The pins 50 and 56 are preferably disposed at 90° in order to provide a universal connection between the motor and the sleeve 58.

The fastener cam sleeve 58 is rotatably disposed within the operating cam sleeve 62, said operating cam sleeve being secured against longitudinal movement with respect to the barrel 34 by the shoulder 54 and the end 44. The outer wall of the operating cam sleeve 62 is concentric with the barrels 34 and 26, but said sleeve 62 is eccentrically bored whereby the fastener cam sleeve 58 is eccentrically mounted with respect to the barrels 34 and 26 (Figure 7), and the shaft 52 is concentrically mounted with respect to the barrels 34 and 26. The pin 56 extends beyond the outer wall of the fastener cam sleeve 58 and is received in oppositely disposed helical slots 64 and 66 provided in the operating cam sleeve, said helical slots being milled concentric with the outer surface of sleeve 62 and extending for substantially 180° whereby the sleeve 62 rotates through 180° as a result of the pin 56 being moved from the rear portion of the slots 64 and 66, as viewed in Figures 1 and 2, to the front portion of said slots, that is, to the right hand portions of said slots as viewed in said figures. The milling of the helical slots 64 and 66 concentric with the outer surface of sleeve 60 and the fact that the inner surface of said sleeve is eccentric with respect to the outer surface is the reason slots 62 are slightly angularly disposed.

The tool end 44 at its end is provided with the nose 68 and in the embodiment shown the end of the nose is slotted as at 70 to provide the spaced shoulders 72 (Figures 5 and 6) on either side of the center line, said shoulders being of a width to accommodate the head of a fastener to be set, and being of a complementary configuration to the head of said fastener. It is of course understood that this nose may be provided with other securing means for holding the head of the fastener to be set, such as a cam, dog, etc.

Between the shoulders 72 there is provided an eccentric spinning or upsetting cam 74, said cam being provided with the stem 76 extending through the sleeve 62 and being rotatable with respect thereto. The axis of said stem is concentric to the axis of sleeve 58 and eccentric to the outer surface of sleeve 62 and shaft 52 and surface 82 of member 80 and is non-rotatably connected as at 78 to the sleeve 58 whereby relative rotation of the sleeve 58 by movement of the pin 56 from the rear portion of the slots as viewed in Figures 1 and 2 to the front portion of the slots, rotates the cam 74 from the position illustrated in Figure 5 through substantially 180° to the position illustrated in Figure 6.

The operating cam sleeve 62 is provided with the anti-cocking and holding member 80 which extends for substantially 180°, the outer surface 82 thereof being a portion of a cylinder and concentric with the barrels 34 and 26. The open or inner portion 84 of said member 80 is of a configuration to permit the cam 74 to rotate from the position illustrated in Figure 5 to the position illustrated in Figure 6. The portion 86 of the inner portion 84 may be disposed and shaped so that it is engaged by the cam 74 in its fully open position as illustrated in Figure 6 in order to limit the outward position of the cam 74 when it is fully operative which occurs at the time the pin 56 is substantially at the forward end of slots 64 and 66. The member 80 preferably extends slightly beyond the end of the cam 74 in order to aid in preventing the fastener from cocking with respect to the nose. The securement of the fastener on the member 80 is more particularly described in reference to the operation of the tool. Also, as the cam is fixedly connected to sleeve 58 and as a longitudinal bearing is provided therefor by cam sleeve 62, the cam is prevented from wiggling or becoming distorted or out of its proper position in the tool. As before pointed out, the axis of stem 76 is concentric to the axis of the inner sleeve 58. The axis of the member 80 is concentric to that of the outer surface of the outer sleeve 62, so that the axis of stem 76 has the same eccentricity with respect to the axis of member 80 as the eccentricity of sleeve 58 has to the outer surface of the outer sleeve 62.

In order to hold the barrel 34 in its extended position illustrated in Figures 1 and 2, that is, where the cam 74 is in the position illustrated in Figure 5, latching means 88 (Figures 3 and 4) may be provided. Said latching means may conveniently take the form of the rigid latching member 90 disposed in a recess 92 provided in the barrel 34, the outer end of the latching member 90 being pivoted as at 94 within the recess 92 by means of the end 44. The opposite end of the member 90 is provided with a latching shoulder 96 adapted to engage the end 48 of the barrel 26 for maintaining the barrel 34 in fully projected position (Figure 1), the latch member 90 being urged outwardly by means of the spring 98. Depressing the latch member 90 against the spring 98 moves the latching shoulder 96 and the latching member 90 fully within the recess 92 whereby the barrel 34 can be moved inwardly to its fullest position where the shoulders 46 and 48 are in engagement. This position also facilitates assembly, since when the shoulders 46 and 48 are in engagement the end of the shaft 52 extends beyond the end of the barrel 34, permitting the pin 56 to be applied.

Referring now to the modification illustrated in Figure 8, a form of device is illustrated particularly adaptable for use in setting fastening means located in places normally difficult to reach. In this case the setting tool is substantially the same as that already described, being provided with the movable main sleeve or barrel 100 corresponding to the barrel 26, said barrel 100 carrying the reciprocable sleeve or barrel 102 corresponding to the barrel 34. Said barrel 102 is non-rotatable and slidable with respect to the barrel 100, and is provided with the end 104 corresponding to the end 44. The end 104 carries the member 80 and the cam 74 operated by sleeves corresponding to sleeves 58 and 62 as already described. The end of the barrel 100 is closed as at 106 and a flexible drive shaft 108 is connected at one end to a source of power supply (not shown), and extends into the barrel 100 and is connected to the fastener cam sleeve 58 in a manner already described, or to a shaft corresponding to shaft 52, a coupling being provided at the left end for a connection similar to 50. The operation of course is similar to the form of device illustrated in Figures 1 to 7 inclusive, and a latch member similar to latch 90 may also be provided. It is further understood that a tool similar to that shown in Figure 8 may be used with a stationary tool, as for subassemblies, flat work and the like.

Referring now to the construction illustrated in Figure 9, a form of tool end is shown wherein adjustments may be manually made by the operator for setting fasteners to hold different thicknesses of material. This tool consists essentially of an outer movable barrel 110, corresponding to the barrel 26, and the slidable non-rotatable barrel 112, corresponding to the barrel 34. The end of the barrel 112 is threaded as at 114 for the reception of corresponding threads of the tool end member 116, said end being internally threaded at 118 for the reception of complementary threads of the movable nose 120. A locking member or nut 122 is provided for maintaining the nose 120 in fixed adjustment. The operating cam sleeve 124 is disposed within the barrel 112 and is provided with the shoulder 126 adapted to engage the fixed shoulder 128 provided on the barrel 112. The sleeve 124 is fixed against longitudinal movement as by the fastening means 136 disposed in the recess 138 provided in the barrel 112. The end of the sleeve 124 is provided with the outwardly extending anti-cocking and holding member 140, corresponding to the member 80, and the cam 142, corresponding to the cam 74, is provided adjacent thereto. Said cam is provided with the stem 144 extending through the projection 146 on which the positioning member 140 is provided, the stem being non-rotatably secured as at 147 to the fastener cam sleeve 148, similar to the sleeve 58. Said sleeve 148 is provided with the helical tracks or slots (not shown) corresponding to the tracks 64 and 66, and is provided with the elongated slots 150, corresponding to the slots 60, for the reception of the pin 152, corresponding to the pin 56, through which the drive shaft 154 is connected to said sleeves, it being understood that the pin 152 is also received in the helical slots in the sleeve 124.

As before, the nose 120 is provided with holding means for the fastener head, in the form shown, said means being the slot 156 corresponding to the slot 70. Thus, when it is desired to adjust the depth at which the tool is effective, it is only necessary to loosen the fastening means 122, adjust the nose 120 inwardly or outwardly of the end member 116 as desired, and then retighten the fastening means 122. The tools thus far described are for opening or upsetting only a single portion of a fastening means, as only one cam 74 (or 142) is shown. This form of device is adapted for use with fastening means such as illustrated in Figures 12 to 15 inclusive.

Referring to the form of fastener (or rivet) illustrated in Figures 12, 13 and 15, said fastener consists of a body portion or shank 158 and a beveled head 160. The head in plan (Figure 15) is illustrated wherein the portions 162 and 164 are arcs of a circle concentric with the axis of the body portion 158. The sides 166 and 168 are flattened and are parallel for reception between the shoulders 72 of the tool nose. The body portion 158 is cylindrical and adapted to be inserted in aligned apertures 170 and 172 of the materials 174 and 176 to be joined or connected, and the fastener is provided with a cylindrical or slightly tapered recess 178, circular in plan as shown in Figure 15, and terminating short of the end of the fastener, leaving it closed as by the wall 180. The fastener may thus be placed upon the anti-cocking and holding member 80 and the cam 74 when the tool is in the position as shown in Figure 1, wherein the relative positions of the piloting and positioning member and the cam are as illustrated in Figure 5. The fastener is then lowered to a position where the sides 166 and 168 engage the shoulders 72 whereby rotation of the fastener is prevented upon rotation of the cam, and, inasmuch as the cam and the piloting and positioning member are as shown in Figure 5, they substantially fill the recess 178 in a transverse direction. Releasing the member 90 and slightly moving the barrel 34 toward the left as viewed in Figure 1, holds the fastener on the nose whereby no other holding of the rivet is necessary. This holding is accomplished by the cam 74 and the anti-cocking and holding member 80 because as the sleeve 34 is slightly moved toward the left as viewed in Figure 1, pin 56 being held stationary by the inertia of the motor, grooves 60, and necessarily grooves 64 and 66, move along pin 56 and consequently the anti-cocking and holding member rotates in a clockwise direction, as seen in Figures 5 and 6, as a result of the curved nature of grooves 64 and 66. Inasmuch as the cam 74 is fastened to the sleeve 58, and sleeve 58 is prevented from rotating by pin 56, the cam will not rotate about its axis since the shaft 52 is, as previously stated, held stationary by the inertia of the motor. Accordingly, the clockwise rotation of the anti-cocking and holding member moves the anti-cocking and holding member out of contact with the cam 74, whereby the cam relatively will move slightly toward the relative position illustrated in Figure 6 a sufficient distance to cause cam 74 and holding member 80 to press against the inner face of the fastener and thus to hold the fastener in a stationary position on the anti-cocking and holding member and the cam. With the fastener thus held in position the operator readily may insert or pilot the fastener into the apertures of the work to be secured by simply maintaining the tool with barrel 34 pressed toward the motor to maintain the fastener on the cam 74 and holding member 80, thus utilizing said cam and holding means for inserting the fastener into said apertures. In other words, it is not necessary to first insert the fastener in the apertures of the parts to be fastened and then to insert the cam 74 and the means 80 in the recess of the fastener, which would be a very slow operation. Thus the tool acts as means for readily piloting the fastener into the holes of the parts to be joined and to hold it there and also acts as setting means for the fastener. The fastener is then inserted in the apertures 170 and 172 until the bottom plane 182 of the head 160 abuts the material 174.

Starting of the motor 20 after insertion of the fastener in the apertures 170 and 172 causes the motor shaft, which is rotating counterclockwise (Figures 5, 6 and 7), to rotate the shaft 52 (counterclockwise), thus rotating the pin 56 and sleeves 58 and 62 counterclockwise. This rotation causes the face of cam 74 to press against the inner face of the fastener circumferentially thereof. It will be seen that at this stage all that is necessary to upset outwardly the material of the fastener is to increase the pressure of the cam 74 against said inner face of the fastener and to turn the cam relative to the pilot 80 from the position very nearly like that in Figure 5, as above described, to that in Figure 6, as the rapidly turning cam 74 forces outwardly the material of the fastener. Since the latch member 90 has been released, as the tool is pushed to maintain the fastener head pressed against the plates to be riveted the pressure also acts to force cam 74 against the internal wall of the fastener. This pressure causes the barrel 26 to move toward the right as viewed in Figure 1 until the shoulder 48 abuts the shoulder 46. As the shoulder 48 is being moved to abut the shoulder 46, the pin 56 is moved along slot 60 in sleeve 58. In doing so pin 56 travels up the helical slots 64 and 66, thus causing rotation of the sleeve 62 (clockwise) with respect to the sleeve 58, thereby causing the member 80 to change its position with respect to the cam 74, that is, to move from the relative position nearly like that shown in Figure 5, as above described, to that shown in Figure 6, it being understood, of course, that while this is taking place the sleeves 58 and 60 are rotating together due to the rotation of shaft 22 and pin 56.

This gradual change of relative position between member 80 and cam 74 causes the cam to be forcibly projected outwardly farther and farther until its maximum position is reached as shown in Figure 6, and this forcible outward projection combined with the continuous rotation of the cam causes the bulbous portion 184 to be spun or upset whereby the fastener assumes the contour as illustrated in Figure 13, it being remembered that as the means 80 and cam 74 are changing relative positions by movement of the anti-cocking and holding member clockwise, they are rotating at a high rate of speed in a counterclockwise direction. This spinning, of course, tightly secures the materials 174 and 176, yet no fracture of the materials occurs, and no fracture or fragmentation of the fastener occurs.

After the fastener has been set the motor switch may be opened causing the shaft 52 to stop revolving consequently causing the cam 74 to cease revolving. The casings 20 and 26 are then moved rearwardly away from barrel 34 causing pin 56 to be moved from its forward position to its rearward position (Figure 1), whereupon reverse operation to that already described occurs between sleeves 62 and 58 which causes the cam 74 to move from its position as shown in Figure 6 to its inoperative position as shown in Figure 5, so that the cam and anti-cocking and positioning member 80 may be dissociated from the fastener, whereupon the tool is conditioned to receive another fastener to be set.

In Figure 14 a fastener is illustrated fastening together materials 186 and 188, the fastener 190 having been inserted in aligned apertures 192 and 194. A head 196 is provided on the fastener similar to the head 160 and the depth of the fastener is such that the bulbous portion 198 may be spun or upset as illustrated in the full lines in Figure 14, or the spinning or upsetting cam may be so disposed (i. e. spaced outwardly of the nose) that the first spinning operation forms the bulbous portion 200 as illustrated in the dotted lines in Figure 14. The tool may then be continuously operated, but bodily moved toward the left as viewed in Figure 14, to cause the head 198 to be formed as shown in the full line position of Figure 14.

Other forms of heads may be used such as square, hex, tear drop, oval, etc., it being only necessary to vary the holding means formed on the tool nose, such as varying the shape of the slot 70 to correspond to the desired head shape.

In the form of fastener illustrated in Figures 18 and 19, the fastener has a circular head 202 in plan, and a circular body portion or shank 204, the axis of which is concentric with the center of the cylindrical head 202, and being similar to that shown at 158 in Figure 12. A concentric recess 206 is also provided similar to the recess 178 and, in this case, in order to provide means for preventing rotation of the fastening means when it is being set, a shallow square recess 208 is provided in the upper portion of the head 202.

A form of tool end for use with the type of fastener illustrated in Figures 18 and 19 is shown in Figures 20 and 21. The end 210 is provided with a nose 212 corresponding to the nose 68 (Figure 1), being provided with the anti-cocking and holding member 214, corresponding to the member 80, and the cam member 216, corresponding to the cam member 74. Adjacent the member 214 there is provided an elongated projection 218 adapted to engage along one side of the wall of the recess 208 as shown in dotted lines in Figure 18. Thus, when the bulbous portion is spun by the cam, the projection 218 will prevent rotation of the fastening. Though this projection is illustrated in one position, other positions which enable it to engage the recess 208 may be occupied, or it may extend partially or wholly around the cam and positioning members.

In the form of fastener shown in Figures 22 and 23, said fastener is likewise provided with the circular head 220, the center of which is concentric with the longitudinal axis of the cylindrical shank 222, corresponding to shank 158. A circular recess 224 is provided extending downwardly corresponding to the recess 178. The plan of said recess is circular and concentric with the head 220. A shallower recess 226 is provided which, however, is eccentric with respect to the aperture 224.

The setting tool for the form of fastener illustrated in Figures 22 and 23 is provided with the end as shown in Figures 24 and 25. Said end 228 is provided with the circular concentric projection or nose 230, being of substantially cylindrical shape and the anti-cocking and holding member 232 is provided similar to the member 60 and similarly placed with respect to the barrel, as is also the cam 234 which corresponds to the cam 74. The depth of the member 230 is substantially the depth of the recess 226. Thus, the anti-cocking and holding member 232 is inserted in the recess 224 and the nose 230 enters the recess 226. Operation of the device then causes a wedging action between the anti-cocking and holding member 232 and the recess 224, and the nose 230 and the recess 226, preventing rotation of the fastener.

As has already been stated, it is not necessary that the fasteners have a closed end such as shown at 180 in Figure 12. They may be open at said end. Where an open fastener is provided similar to the well known eyelet, it may be advantageous to use simply unflanged cylindrical fastener opened at both ends instead of having one end provided with a head, or flat stock may be used which may be rounded as necessary to form it of a shape such as that of seamed tubing. Where either of these forms is used, one end is provided with means for preventing rotation of the fastener. For example, in Figures 16 and 17 there is shown two members 236 and 238 to be secured together. The tube member 239 is shown as having been inserted in the aligned apertures 240 and 242 thereof, and the bulbous portions 244 and 246 have been spun or upset in a single operation. The notches 248 are provided for preventing rotation of the fastener while it is being applied.

In order to set the tubular form of fastener, a construction such as shown in Figures 10 and 11 is provided for the tool end. In this case the tool end 250 is provided with the nose 252 having an aperture 254 therein. The operating cam sleeve 256 is disposed within the nose and the adjacent movable barrel 258 in a manner already described with respect to sleeve 62 and barrel 34, said sleeve 256 being provided with the outwardly projecting anti-cocking and holding member 260. The sleeve 256 is provided with the slot 262 for permitting assembly of the fastener cam sleeve 270 and the shank 264 of the double cam member 266 into sleeve 256, which assembly is done by turning cams 272 and 274 and sleeve 270 one hundred and eighty degrees from the position shown in Figure 10 when sliding sleeve 270 with shank 264 affixed thereto into sleeve 256, the shank being fastened as at 268 to the fastener cam sleeve 270 corresponding to the sleeve 58, it being understood that the cam 266 is non-rotatable with respect to the sleeve 270. The double cam member 266 is provided with the double cams 272 and 274 spaced apart a predetermined distance determined by the desired relative positions of the bulbous portions 244 and 246 (Figure 16). The cams are adapted to spin the bulbous portions 244 and 246 of the fastener illustrated in Figures 16 and 17, and the notches 248 are adapted to be received on the spaced projections 276 provided on the nose 252 for preventing rotation of the tubular member (rivet) 239 (Figure 16). Likewise, the anti-cocking and holding member 260 is provided with the bearing portion 278 disposed between the cam members 272 and 274 to furnish a bearing for the cams.

It is of course understood that a multiple cam member similar to the member 266 having any number of cams thereon may be provided which, for example, may be used for stacking assemblies such as shown in Figure 26. In this case, a member is used which is provided with four spaced cams for spinning the bulbous portions 280, 282, 284 and 286 in the tubular member or rivet 287 for securing the members 288 and 290 and 291 in predetermined positions. This is very useful for subassemblies, and additionally has the advantage of taking up tolerances between the members 288 and 290 and 291 to permit accurate spacing between said members.

In certain forms of the fastener it may be desired to fill in the recess, such as at 178 in Figure 12, and at 190 in Figure 14, the filling material extending rearwardly and being anchored by means of the bulbous portion 184 or 198. This may also be done, of course, in the tubular fastener such as shown in Figures 16 and 26, the bulbous portions forming anchoring means. Thus a flush construction is provided where needed. At the same time, however, with the use of the hollow rivet or fastener an anti-cocking and holding means is provided for facilitating removal of the rivet or fastener without damage to the materials which are secured. This would be particularly advantageous in removing airplane rivets so that no damage is done to the skins. Additionally, it will be appreciated that this type of tool and rivet is advantageous in securing together materials which are thin and which must not be damaged. In airplane work, for example, it is very undesirable that the skins be fragmented or weakened by the rivets. With applicant's fastener and tool for applying said fastener, the skins may be tightly drawn together, yet the fastener is not damaged in its application as by fragmenting, nor are the skins damaged. Further, the application of the fastener is tight and no shock is produced which would cause misalignment of adjacent structures.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a tool of the character described, the combination of rotatable anti-cocking and holding means, rotatable cam means, means for rotating said anti-cocking and holding means and cam means about a common axis, and means for relatively rotating said anti-cocking and holding means and said cam means, said anti-cocking and holding means and said cam means being relatively fixed in the direction of said axis.

2. In a tool of the character described, the combination of rotatable anti-cocking and holding means, rotatable cam means, means for rotating said anti-cocking and holding means and cam means about a common axis, and means for relatively rotating one of said first two named means with respect to the other of said first two named means, said first two named means being relatively fixed in the direction of said axis.

3. In a tool of the character described, the combination of rotatable anti-cocking and holding means for aiding in holding and positioning fastening means, rotatable cam means for setting said fastening means, means for rotating said anti-cocking and holding means and cam means about a common axis, and means for changing the relative position between said anti-cocking and holding means and said cam means about said axis when said fastening means is being set and for again changing the relative position between said anti-cocking and holding means and said cam means after said fastening means has been set to release said tool from said fastening means.

4. In a tool of the character described, the combination of a barrel, rotatable means extending into said barrel, members rotatably mounted in said barrel and operatively connected to said rotatable means whereby rotation of said rotatable means rotates said members, one of said first named members having a projecting member fixed thereto, the other of said first named members having a cam member fixed thereto, and means for causing relative movement about a common axis btween said cam member and said projecting member.

5. In a tool of the character described, the combination of a barrel, rotatable means extending into said barrel, members fixed against relative linear movement, said members being rotatably mounted in said barrel and operatively connected to said rotatable means whereby rotation of said rotatable means rotates said members, one of said first named members having a projecting member fixed thereto, the other of said first named members having a cam member fixed thereto, and means for causing relative movement about a common axis between said cam member and said projecting member.

6. In a tool of the character described, the combination of a barrel, a relatively movable barrel slidably mounted in said first named barrel, means for limiting movement between said barrels, rotatable means extending into said second named barrel, members rotatably mounted in said second named barrel and operatively connected to said rotatable means whereby rotation of said rotatable means rotates said members, one of said first named members having a projecting member fixed thereto, the other of said first named members having a cam member fixed thereto, and means for causing relative movement between said cam member and said projecting member when said second named barrel is moved with respect to said first named barrel.

7. In a tool of the character described, the combination of a main barrel having concentric cylindrical portions, a shoulder between said portions, a second barrel slidably mounted in one of said cylindrical portions and having a shoulder adapted to engage said first named shoulder when said second barrel is in one position with respect to said main barrel, an end for said second barrel terminating in a nose, said end being adapted to engage said main barrel when said second barrel is in another position with respect to said main barrel, said end and said second barrel having concentric inner cylindrical portions concentric with the cylindrical portions of said main barrel, an operating cam sleeve rotatably mounted in said second barrel and said end, means for preventing linear movement between said operating cam sleeve and said end and second barrel, said sleeve having a spiral track therein and having a cylindrical bore circular in section, the axis of said bore being spaced from the axes of said barrels, a fastener cam sleeve mounted for rotation in said bore, said fastener cam sleeve having a longitudinal slot therein, said operating cam sleeve having an anti-cocking and holding member extending outwardly of the end of the nose, the outer lateral surface thereof being a portion of a cylinder the axis of which corresponds to the axes of said barrels, said fastener cam sleeve being provided with a cam member interfitting in one position with said anti-cocking and holding member whereby it is in its inward position where it is substantially within the path of rotation of said anti-cocking and holding member but being adapted to be rotated to its outward position where it extends outwardly of the path of rotation of said anti-cocking and holding member, the axis of rotation of said cam member coinciding with the axis of rotation of said fastener cam sleeve, and a shaft for rotating said sleeves, said shaft having a member receivable in said spiral track and said longitudinal slot whereby when said barrels are relatively moved so that said second barrel is in the second referred to position with respect to said first barrel said sleeves are rotated with respect to each other to thereby move said cam member to its outward position.

8. In a tool of the character described, the combination of a main barrel having concentric cylindrical portions, a shoulder between said portions, a second barrel slidably mounted in one of said cylindrical portions and having a shoulder adapted to engage said first named shoulder when said second barrel is in one position with respect to said main barrel, an end for said second barrel terminating in a nose, positioning means on said nose for receiving a fastener adapted to be formed with fastening means by said tool, said end being adapted to engage said main barrel when said second barrel is in another position with respect to said main barrel, said end and said second barrel having concentric inner cylindrical portions concentric with the cylindrical portions of said main barrel, an operating cam sleeve rotatably mounted in said second barrel and said end, means for preventing linear movement between said operating cam sleeve and said end and second barrel, said sleeve having a spiral track therein and having a cylindrical bore circular in section, the axis of said bore being spaced from the axes of said barrels, a fastener cam sleeve mounted for rotation in said bore, said fastener cam sleeve having a longitudinal slot therein, said operating cam sleeve having an anti-cocking and holding member extending outwardly of the end of the nose, the outer lateral surface thereof being a portion of a cylinder the axis of which corresponds to the axes of said barrels, said fastener cam sleeve being provided with a cam member interfitting in one position with said anti-cocking and holding member whereby it is in its inward position where it is substantially within the path of rotation of said anti-cocking and holding member but being adapted to be rotated to its outward position where it extends outwardly of the path of rotation of said anti-cocking and holding member whereby said fastening means is formed, the axis of rotation of said cam member coinciding with the axis of rotation of said fastener cam sleeve, and a shaft for rotating said sleeves, said shaft having a member receivable in said spiral track and said longitudinal slot whereby when said barrels are relatively moved so that said second barrel is in the second referred to position with respect to said first barrel said sleeves are rotated with respect to each other to thereby move said cam member to its outward position.

9. In a tool of the character described, the combination of a main barrel having concentric cylindrical portions, a shoulder between said portions, a second barrel slidably mounted in one of said cylindrical portions and having a shoulder adapted to engage said first named shoulder when said second barrel is in one position with respect to said main barrel, an end for said second barrel terminating in a nose, said nose being movable with respect to said end and having positioning means on said nose for receiving a fastener adapted to be formed with fastening means by said tool, said end being adapted to be formed with fastening means by said tool, said end being adapted to engage said main barrel when said second barrel is in another position with respect to said main barrel, said end and said second barrel having concentric inner cylindrical portions concentric with the cylindrical portions of said main barrel, an operating cam sleeve rotatably mounted in said second barrel and said end, means for preventing linear movement between said operating cam sleeve and said end and second barrel, said sleeve having a spiral track therein and having a cylindrical bore circular in section, the axis of said bore being spaced from the axes of said barrels, a fastener cam sleeve mounted for rotation in said bore, said fastener cam sleeve having a longitudinal slot therein, said operating cam sleeve having an anti-cocking and holding member extending outwardly of the end of the nose, the outer lateral surface thereof being a portion of a cylinder the axis of which corresponds to the axes of said barrels, said fastener cam sleeve being provided with a cam member interfitting in one position with said anti-cocking and holding member whereby it is in its inward position where it is substantially within the path of rotation of said anti-cocking and holding member but being adapted to be rotated to its outward position where it extends outwardly of the path of rotation of said anti-cocking and holding member, the axis of rotation of said cam member coinciding with the axis of rotation of said fastener cam sleeve, and a shaft for rotating said sleeves, said shaft having a member receivable in said spiral track and said longitudinal slot whereby when said barrels are relatively moved so that said second barrel is in the second referred to position with respect to said first barrel said sleeves are rotated with respect to each other to thereby move said cam member to its outward position.

10. In a tool of the character described, the combination of a main barrel having concentric cylindrical portions, a shoulder between said portions, a second barrel slidably mounted in one of said cylindrical portions and having a shoulder adapted to engage said first named shoulder when said second barrel is in one position with respect to said main barrel, an end for said second barrel terminating in a nose, said end being movable with respect to said end, said end being adapted to engage said main barrel when said second barrel is in another position with respect to said main barrel, said end and said second barrel having concentric inner cylindrical portions concentric with the cylindrical portions of said main barrel, an operating cam sleeve rotatably mounted in said second barrel and said end, means for preventing linear movement between said operating cam sleeve and said end and second barrel, said sleeve having a spiral track therein and having a cylindrical bore circular in section, the axis of said bore being spaced from the axes of said barrels, a fastener cam sleeve mounted for rotation in said bore, said fastener cam sleeve having a longitudinal slot therein, said operating cam sleeve having an anti-cocking and holding member extending outwardly of the end of the nose, the outer lateral surface thereof being a portion of a cylinder the axis of which corresponds to the axes of said barrels, said fastener cam sleeve being provided with a cam member interfitting in one position with said anti-cocking and holding member whereby it is in its inward position where it is substantially within the path of rotation of said anti-cocking and holding member but being adapted to be rotated to its outward position where it extends outwardly of the path of rotation of said anti-cocking and holding member, the axis of rotation of said cam member coinciding with the axis of rotation of said fastener cam sleeve, and a shaft for rotating said sleeves, said shaft having a member receivable in said spiral track and said longitudinal slot whereby when said barrels are relatively moved so that said second barrel is in the second referred to position with respect to said first barrel said sleeves are rotated with respect to each other to thereby move said cam member to its outward position.

11. In a tool of the character described, the combination of a main barrel having concentric cylindrical portions, a shoulder between said portions, a second barrel slidably mounted in one of said cylindrical portions and having a shoulder adapted to engage said first named shoulder when said second barrel is in one position with respect to said main barrel, an end for said second barrel terminating in a nose, said end being adapted to engage said main barrel when said second barrel is in another position with respect to said main barrel, said end and said second barrel having concentric inner cylindrical portions concentric with the cylindrical portions of said main barrel, an operating cam sleeve rotatably mounted in said second barrel and said end, means for preventing linear movement between said operating cam sleeve and said end and second barrel, said sleeve having a spiral track therein and having a cylindrical bore circular in section, the axis of said bore being spaced from the axes of said barrels, a fastener cam sleeve mounted for rotation in said bore, said fastener cam sleeve having a longitudinal slot therein, said operating cam sleeve having an anti-cocking and holding member extending outwardly of the end of the nose, said anti-cocking and holding member having a bearing portion spaced from said nose the outer lateral surface thereof being a portion of a cylinder the axis of which corresponds to the axes of said barrels, said fastener cam sleeve being provided with spaced cam members disposed on opposite sides of said bearing portion and in bearing engagement therewith, said cam members interfitting in one position with said anti-cocking and holding member whereby they are in their inward position where they are substantially within the path of rotation of said anti-cocking and holding member but being adapted to be rotated to their outward position where they extend outwardly of the path of rotation of said anti-cocking and holding member, the axis of rotation of said cam members coinciding with the axis of rotation of said fastener cam sleeve, and a shaft for rotating said sleeves, said shaft having a member receivable in said spiral track and said longitudinal slot whereby when said barrels are relatively moved so that said second barrel is in the second referred to position with respect to said first barrel said sleeves are rotated with respect to each other to thereby move said cam members to their outward position.

12. In a tool of the character described, the combination of a main barrel having concentric cylindrical portions, a shoulder between said portions, a second barrel slidably mounted in one of said cylindrical portions and having a shoulder adapted to engage said first named shoulder when said second barrel is in one position with respect to said main barrel, an end for said second barrel terminating in a nose, positioning means on said nose for receiving a fastener adapted to be formed with fastening means by said tool, said end being adapted to engage said main barrel when said second barrel is in another position with respect to said main barrel, said end and said second barrel having concentric inner cylindrical portions concentric with the cylindrical portions of said main barrel, an operating cam sleeve rotatably mounted in said second barrel and said end, means for preventing linear movement between said operating cam sleeve and said end and second barrel, said sleeve having a spiral track therein and having a cylindrical bore circular in section, the axis of said bore being spaced from the axes of said barrels, a fastener cam sleeve mounted for rotation in said bore, said fastener cam sleeve having a longitudinal slot therein, said operating cam sleeve having an anti-cocking and holding member extending outwardly of the end of the nose, said anti-cocking and holding member having a bearing portion spaced from said nose, the outer lateral surface thereof being a portion of a cylinder the axis of which corresponds to the axes of said barrels, said fastener cam sleeve being provided with spaced cam members disposed on opposite sides of said bearing portion and in bearing engagement therewith, said cam members interfitting in one position with said anti-cocking and holding member whereby they are in their inward position where they are substantially within the path of rotation of said anti-cocking and holding member but being adapted to be rotated to their outward position where they extend outwardly of the path of rotation of said anti-cocking and holding member whereby said fastening means are formed, the axes of rotation of said cam members coinciding with the axis of rotation of said fastener cam sleeve, and a shaft for rotating said sleeves, said shaft having a member receivable in said spiral track and said longitudinal slot whereby when said barrels are relatively moved so that said second barrel is in the second referred to position with respect to said first barrel said sleeves are rotated with respect to each other to thereby move said cam members to their outward position.

13. In a tool of the character described, the combination of a main barrel having concentric cylindrical portions, a shoulder between said portions, a second barrel slidably mounted in one of said cylindrical portions and having a shoulder adapted to engage said first named shoulder when said second barrel is in one position with respect to said main barrel, an end for said second barrel terminating in a nose, said end being adapted to engage said main barrel when said second barrel is in another position with respect to said main barrel, said end and said second barrel having concentric inner cylindrical portions concentric with the cylindrical portions of said main barrel, an operating cam sleeve rotatably mounted in said second barrel and said end, means for preventing linear movement between said operating cam sleeve and said end and second barrel, said sleeve having a spiral track therein and having a cylindrical bore circular in section, the axis of said bore being spaced from the axes of said barrels, a fastener cam sleeve mounted for rotation in said bore, said fastener cam sleeve having a longitudinal slot therein, said operating cam sleeve having an anti-cocking and holding member extending outwardly of the end of the nose, the outer lateral surface thereof being a portion of a cylinder the axis of which corresponds to the axes of said barrels, said fastener cam sleeve being provided with a cam member interfitting in one position with said anti-cocking and holding member whereby it is in its inward position where it is substantially within the path of rotation of said anti-cocking and holding member but being adapted to be rotated to its outward position where it extends outwardly of the path of rotation of said anti-cocking and holding member, the axis of rotation of said cam member coinciding with the axis of rotation of said fastener cam sleeve, a shaft for rotating said sleeves, said shaft having a member receivable in said spiral track and said longitudinal slot whereby when said barrels are relatively moved so that said second barrel is in the second referred to position with respect to said first barrel said sleeves are rotated with respect to each other to thereby move said cam member to its outward position, power means for operating said shaft remotely disposed from said tool, and flexible means connecting said power means and shaft.

14. In a tool of the character described, the combination of a main barrel having concentric cylindrical portions, a shoulder between said portions, a second barrel slidably mounted in one of said cylindrical portions and having a shoulder adapted to engage said first named shoulder when said second barrel is in one position with respect to said main barrel, an end for said second barrel terminating in a nose integral with said end and immovable with respect thereto, said end being adapted to engage said main barrel when said second barrel is in another position with respect to said main barrel, said end and said second barrel having concentric inner cylindrical portions concentric with the cylindrical portions of said main barrel, an operating cam sleeve rotatably mounted in said second barrel and said end, means for preventing linear movement between said operating cam sleeve and said end and second barrel, said sleeve having a spiral track therein and having a cylindrical bore circular in section, the axis of said bore being spaced from the axes of said barrels, a fastener cam sleeve mounted for rotation in said bore, said fastener cam sleeve having a longitudinal slot therein, said operating cam sleeve having an anti-cocking and holding member extending outwardly of the end of the nose, the outer lateral surface thereof being a portion of a cylinder the axis of which corresponds to the axes of said barrels, said fastener cam sleeve being provided with a cam member interfitting in one position with said anti-cocking and holding member whereby it is in its inward position where it is substantially within the path of rotation of said anti-cocking and holding member but being adapted to be rotated to its outward position where it extends outwardly of the path of rotation of said anti-cocking and holding member, the axis of rotation of said cam member coinciding with the axis of rotation of said fastener cam sleeve, a shaft for rotating said sleeves, said shaft having a member receivable in said spiral track and said longitudinal slot whereby when said barrels are relatively moved so that said second barrel is in the second referred to position with respect to said first barrel said sleeves are rotated with respect to each other to thereby move said cam member to its outward position, and power means for said shaft connected thereto and movable with said tool.

15. In a tool of the character described, the combination of a main barrel having concentric cylindrical portions, a shoulder between said portions, a second barrel slidably mounted in one of said cylindrical portions and having a shoulder adapted to engage said first named shoulder when said second barrel is in one position with respect to said main barrel, an end for said second barrel terminating in a nose integral with said end and immovable with respect thereto, said end being adapted to engage said main barrel when said second barrel is in another position with respect to said main barrel, said end and said second barrel having concentric inner cylindrical portions concentric with the cylindrical portions of said main barrel, an operating cam sleeve rotatably mounted in said second barrel and said end, means for preventing linear movement between said operating cam sleeve and said end and second barrel, said sleeve having a spiral track therein and having a cylindrical bore circular in section, the axis of said bore being spaced from the axes of said barrels, a fastener cam sleeve mounted for rotation in said bore, said fastener cam sleeve having a longitudinal slot therein, said operating cam sleeve having an anti-cocking and holding member extending outwardly of the end of the nose, the outer lateral surface thereof being a portion of a cylinder the axis of which corresponds to the axes of said barrels, said fastener cam sleeve being provided with a single cam member interfitting in one position with said anti-cocking and holding member whereby it is in its inward position where it is substantially within the path of rotation of said anti-cocking and holding member but being adapted to be rotated to its outward position where it extends outwardly of the path of rotation of said anti-cocking and holding member, the axis of rotation of said cam member coinciding with the axis of rotation of said fastener cam sleeve, and a shaft for rotating said sleeves, said shaft having a member receivable in said spiral track and said longitudinal slot whereby when said barrels are relatively moved so that said second barrel is in the second referred to position with respect to said first barrel said sleeves are rotated with respect to each other to thereby move said cam member to its outward position.

KENLY C. BUGG.

CERTIFICATE OF CORRECTION.

Patent No. 2,359,402.　　　　　　　　　　　　　　October 3, 1944.

KENLY C. BUGG.

It is hereby certified that error appears in the printed specification of the above numbered patent requiring correction as follows: Page 3, second column, line 7, for "sleeve 60" read --sleeve 62--; line 9, for "slots 62" read --slots 60--; page 8, first column, lines 28 and 29, claim 9, strike out the words "be formed with fastening means by said tool, said end being adapted to--; and that the said Letters Patent should be read with this correction therein that the same may conform to the record of the case in the Patent Office.

Signed and sealed this 16th day of January, A. D. 1945.

Leslie Frazer (Seal)　　　　　　　　　　　　　　　Acting Commissioner of Patents.